(12) United States Patent
Zu et al.

(10) Patent No.: US 11,372,906 B2
(45) Date of Patent: Jun. 28, 2022

(54) METHOD AND APPARATUS FOR INTELLIGENT INTERACTION

(71) Applicant: BAIDU ONLINE NETWORK TECHNOLOGY (BEIJING) CO., LTD., Beijing (CN)

(72) Inventors: Hualong Zu, Beijing (CN); Bo Zhang, Beijing (CN); Xinya Zhang, Beijing (CN); Lingjin Xu, Beijing (CN); Mengmeng Zhang, Beijing (CN); Jingyu Ye, Beijing (CN); Xiaochen Jia, Beijing (CN)

(73) Assignees: BAIDU ONLINE NETWORK TECHNOLOGY (BEIJING) CO., LTD.; SHANGHAI XIAODU TECHNOLOGY CO. LTD.

( * ) Notice: Subject to any disclaimer, the term of this patent is extended or adjusted under 35 U.S.C. 154(b) by 312 days.

(21) Appl. No.: 16/671,254

(22) Filed: Nov. 1, 2019

(65) Prior Publication Data
US 2020/0065319 A1    Feb. 27, 2020

(30) Foreign Application Priority Data
Nov. 1, 2018  (CN) .......................... 201811294664.8

(51) Int. Cl.
*G06F 16/33* (2019.01)
*G06F 16/332* (2019.01)
(Continued)

(52) U.S. Cl.
CPC ...... *G06F 16/3326* (2019.01); *G06F 16/3322* (2019.01); *G06F 16/3349* (2019.01); *G10L 13/00* (2013.01); *H04L 67/26* (2013.01)

(58) Field of Classification Search
None
See application file for complete search history.

(56) References Cited

U.S. PATENT DOCUMENTS 7,912,852 B1    3/2011  McElroy
9,483,535 B1 *  11/2016  Coyle ................... G06F 16/248
(Continued)

FOREIGN PATENT DOCUMENTS

CN      101017489 A     8/2007
CN      105068661 A    11/2015
(Continued)

OTHER PUBLICATIONS

Office Action issued in Chinese Patent Application No. 201811294664.8 dated Apr. 21, 2020.
(Continued)

*Primary Examiner* — Son T Hoang
(74) *Attorney, Agent, or Firm* — Dilworth IP, LLC

(57) ABSTRACT

A method for intelligent interaction including obtaining a query question of a user; obtaining a first query result corresponding to the query question, and outputting the first query result; and outputting push information corresponding to the query question after a first time period, where the push information comprises a second query result and/or first prompt information corresponding to the query question, and the first prompt information is to prompt an acquisition of the second query result corresponding to the query question. The method, by delaying the first time period, actively pushes the second query result corresponding to the query question to the user and/or prompts the user an obtaining of the second query result, to meet an unmet need of the user, or to better meet a need of the user, thereby improving a user experience.

17 Claims, 11 Drawing Sheets

(51) Int. Cl.
    *H04L 67/55*         (2022.01)
    *G10L 13/00*         (2006.01)

(56) References Cited

U.S. PATENT DOCUMENTS

| | | | |
|---|---|---|---|
| 9,904,703 B1* | 2/2018 | Haugen | G06F 16/245 |
| 2005/0165743 A1* | 7/2005 | Bharat | G06F 16/9535 |
| 2006/0206472 A1 | 9/2006 | Masuichi et al. | |
| 2013/0346396 A1 | 12/2013 | Stamm et al. | |
| 2016/0342900 A1* | 11/2016 | Allen | G06F 16/24522 |
| 2018/0046702 A1* | 2/2018 | Jung | G06F 16/9535 |
| 2018/0060029 A1* | 3/2018 | Kogan | G06F 16/951 |
| 2018/0077088 A1 | 3/2018 | Cabrera-Cordon et al. | |
| 2018/0285752 A1* | 10/2018 | Yu | G06F 16/332 |

FOREIGN PATENT DOCUMENTS

| | | |
|---|---|---|
| CN | 105893391 A | 8/2016 |
| CN | 108604237 A | 9/2018 |
| JP | 2008282366 A | 11/2008 |
| WO | 2018043113 A1 | 3/2018 |
| WO | 2018043114 A1 | 3/2018 |
| WO | 2018090338 A1 | 5/2018 |

OTHER PUBLICATIONS

First Office Action of JP Patent Application No. 2019167713 dated Nov. 2, 2020.

* cited by examiner

METHOD AND APPARATUS FOR INTELLIGENT INTERACTION

CROSS-REFERENCE TO RELATED APPLICATIONS

This application claims priority to Chinese Patent Application No. 201811294664.8, filed on Nov. 1, 2018, which is incorporated herein by reference in its entirety.

TECHNICAL FIELD

The present disclosure relates to the field of data mining and, in particular, to a method and an apparatus for intelligent interaction.

BACKGROUND

Human-computer interaction (HCl) is a method to study interaction relationship between a system and users. The system can be a variety of machines, or computerized systems and software. For example, various artificial intelligence systems such as an intelligent customer service system and a voice control system can be realized through human-computer interaction.

An intelligent question answering system is a typical application of the human-computer interaction. A traditional intelligent question answering system is to find a result of a user question in the knowledge base by fuzzy search or similarity calculation, and send a query result to the user. However, the traditional intelligent question answering system, in some cases, cannot immediately find a desired result for the user, or the user is not satisfied with the query result, resulting in a poor user experience.

SUMMARY

The present disclosure provides a method and an apparatus for intelligent interaction, which improve the user experience.

A first aspect of the present disclosure provides a method for intelligent interaction, including:
  obtaining a query question of a user;
  obtaining a first query result corresponding to the query question, and outputting the first query result; and
  outputting push information corresponding to the query question after a first time period, where the push information includes a second query result and/or first prompt information corresponding to the query question, where the first prompt information is to prompt an acquisition of the second query result corresponding to the query question.

In an exemplary embodiment, the method further includes:
  outputting second prompt information, where the second prompt information is to prompt whether to output the push information when the second query result corresponding to the query question is obtained;
  receiving a selection information input by the user according to the second prompt information; and
  determining whether to output the push information according to the selection information.

In an exemplary embodiment, the determining whether to output the push information according to the selection information includes:
  determining to output the push information when the selection information is positive information; and
  determining not to output the push information when the selection information is negative information.

In an exemplary embodiment, before the outputting second prompt information, the method includes:
  receiving evaluation information of the user on the first query result;
  performing an emotional analysis on the evaluation information; and
  determining to output the second prompt information when the evaluation information indicates that the user is not satisfied with the first query result.

In an exemplary embodiment, before the outputting second prompt information, the method further includes:
  receiving evaluation information of the user on the first query result;
  performing an emotional analysis on the evaluation information; and
  determining to output the second prompt information when the evaluation information indicates that the user is satisfied with the first query result, where the second query result is a query result of a related question of the query question.

In an exemplary embodiment, the second prompt information is output when outputting the first query result corresponding to the query question.

In an exemplary embodiment, before the outputting the first query result corresponding to the query question, the method further includes:
  predicting whether the user is satisfied with the first query result; and
  determining to output the second prompt information when it is predicted that the user is satisfied with the first query result, where the second query result is a query result of a related question of the query question.

In an exemplary embodiment, the acquisition time of the second query result is a determinable time, and the second prompt information further includes acquisition time of the second query result.

In an exemplary embodiment, before the receiving evaluation information of the user on the first query result, the method further includes:
  determining that the first query result comprises at least one answer corresponding to the query question;
  the receiving evaluation information of the user on the first query result comprises:
  receiving evaluation information of the user on the answer included in the first query result.

In an exemplary embodiment, before the outputting second prompt information, the method further includes:
  performing an analysis and processing on the query question to obtain a type of the query question; and
  determining to output the second prompt information according to the type of the query question.

In an exemplary embodiment, before the outputting push information corresponding to the query question after a first time period, the method further includes:
  performing an analysis and processing on the query question to obtain a type of the query question; and
  determining to output the push information corresponding to the query question according to the type of the query question.

In an exemplary embodiment, before the performing an analysis and processing on the query question, the method further includes:
  determining that the first query result does not include the answer corresponding to the query question.

In an exemplary embodiment, the method is applied to an intelligent device, and the outputting push information corresponding to the query problem after a first time period includes:

outputting the push information by at least one of the following ways:

sending the push information to a control device for controlling the intelligent device;

or, prompting the user by an indicator light of the intelligent device that the push information is received;

or, displaying the push information by a notification page on the intelligent device;

or, playing the push information by a voice.

In an exemplary embodiment, the playing the push information by a voice includes:

playing the push information by the voice, when it is detected that the user uses the intelligent device to make a query for other question again, and does not obtain an answer to the other question or the user is satisfied with the answer to the other question;

or, playing the push information when a preset time of the user is reached.

A second aspect of the present disclosure provides an apparatus for intelligent interaction, including:

an obtaining module, configured to obtain a query question of a user;

the obtaining module being further configured to obtain a first query result corresponding to the query question;

an outputting module, configured to output the first query result;

a pushing module, configured to output push information corresponding to the query question after a first time period, wherein the push information includes a second query result and/or first prompt information corresponding to the query question, the first prompt information is to prompt an acquisition of the second query result corresponding to the query question.

In an exemplary embodiment, the outputting module is further configured to:

output second prompt information, wherein the second prompt information is to prompt whether to output the push information when the second query result corresponding to the query question is obtained;

the apparatus further includes:

a receiving module, configured to receive selection information input by the user according to the second prompt information;

a determining module, configured to determine whether to output the push information according to the selection information.

In an exemplary embodiment, the determining module is specifically configured to:

determine to output the push information when the selection information is positive information; and determine not to output the push information when the selection information is negative information.

In an exemplary embodiment, the apparatus further includes: an emotion analyzing module and a first determining module;

the receiving module is further configured to receive evaluation information of the user on the first query result;

the emotion analyzing module is configured to perform an emotional analysis on the evaluation information;

the first determining module is configured to determine to output the second prompt information when the evaluation information indicates that the user is not satisfied with the first query result.

In an exemplary embodiment, the apparatus further includes: an emotion analyzing module and a second determining module;

the receiving module is further configured to receive evaluation information of the user on the first query result;

the emotion analyzing module is configured to perform an emotional analysis on the evaluation information;

the second determining module is configured to determine to output the second prompt information when the evaluation information indicates that the user is satisfied with the first query result, where the second query result is a query result of a related question of the query question.

In an exemplary embodiment, the second prompt information is output when outputting the first query result corresponding to the query question.

In an exemplary embodiment, the apparatus further includes:

a predicting module, configured to predict whether the user is satisfied with the first query result;

a third determining module, configured to determine to output the second prompt information when the prediction module predicts that the user is satisfied with the first query result, where the second query result is a query result of a related question of the query question.

In an exemplary embodiment, acquisition time of the second query result is a determinable time, and the second prompt information further includes the acquisition time of the second query result.

In an exemplary embodiment, the apparatus further includes:

a fourth determining module, configured to determine that the first query result includes at least one answer corresponding to the query question;

the receiving module is specifically configured to:

receive evaluation information of the user on the answer included in the first query result.

In an exemplary embodiment, the apparatus further includes:

a type determining module, configured to perform an analysis and processing on the query question to obtain a type of the query question; and a fifth determining module, configured to determine to output the second prompt information according to the type of the query question.

In an exemplary embodiment, the apparatus further includes:

a type determining module, configured to perform an analysis and processing on the query question to obtain a type of the query question; and a sixth determining module, configured to determine to output the push information corresponding to the query question according to the type of the query question.

In an exemplary embodiment, the apparatus further includes:

a seventh determining module, configured to determine that the first query result does not include the answer corresponding to the query question.

In an exemplary embodiment, the apparatus is applied to an intelligent device, and the pushing module is specifically configured to:

output the push information by at least one of the following ways:

sending the push information to a control device for controlling the intelligent device;

or, prompting the user by an indicator light of the intelligent device that the push information is received;

or, displaying the push information by a notification page on the intelligent device;

or, playing the push information by a voice.

In an exemplary embodiment, the pushing module is specifically configured to:

play the push information by the voice, when it is detected that the user uses the intelligent device to make a query for other question again, and does not obtain an answer to the other question or the user is satisfied with the answer to the other question;

or, play the push information when a preset time of the user is reached.

A third aspect of the present disclosure provides an intelligent device, including: a processor, a memory, an audio device and a transceiver, wherein audio device is configured to acquire a voice signal, the memory is configured to store instructions, the transceiver is configured to communicate with other device, and the processor is configured to execute the instructions stored in the memory so that the intelligent device to perform the method according to the first aspect of the present disclosure.

A fourth aspect of the present disclosure provides a computer readable storage medium, where the computer readable storage medium stores instructions that, when executed, causes the computer to perform the method according to the first aspect of the present disclosure.

The method and apparatus for intelligent interaction provided by the present disclosure include: obtaining a query question of the user; obtaining a first query result corresponding to the query question, and outputting the first query result; and outputting push information corresponding to the query question after a first time period, where the push information comprises a second query result and/or first prompt information corresponding to the query question, where the first prompt information is to prompt an acquisition of the second query result corresponding to the query question. After delaying the first time period, the method actively pushes the second query result corresponding to the query question to the user and/or prompts the user obtaining of the second query result, so as to meet needs of the user that had not been met before, or to better meet the needs of the user, thereby improving the user experience.

BRIEF DESCRIPTION OF DRAWINGS

The accompanying drawings herein are incorporated into the description and form part of the present description, showing embodiments consistent with the present disclosure and being used together with the description to explain the principles of the present disclosure.

Through the above accompanying drawings, specific embodiments of the present disclosure have been shown, which will be described in more detail below. These drawings and text descriptions are not intended to limit the scope of conception of the present disclosure in any way, but to explain the concept of the present disclosure to the skilled in the art by referring to specific embodiments.

DESCRIPTION OF EMBODIMENTS

To make the objectives, technical solutions, and advantages of embodiments of the present disclosure clearer, the following clearly and comprehensively describes the technical solutions in embodiments of the present disclosure with reference to the accompanying drawings in embodiments of the present disclosure. Apparently, the described embodiments are merely part of embodiments of the present disclosure, not all embodiments of the present disclosure. Based on the embodiments of the present disclosure, all other embodiments obtained by persons of ordinary skill in the art without creative effort shall fall within the protection scope of the present disclosure.

The present application provides a method and an apparatus for intelligent interaction, the method can be applied to an intelligent device, which can be a wearable electronic device such as an intelligent speaker, an intelligent mobile phone, an intelligent watch, an intelligent bracelet, an intelligent glasses. The intelligent device is capable of conducting intelligent question and answer with the user.

Figure 1:
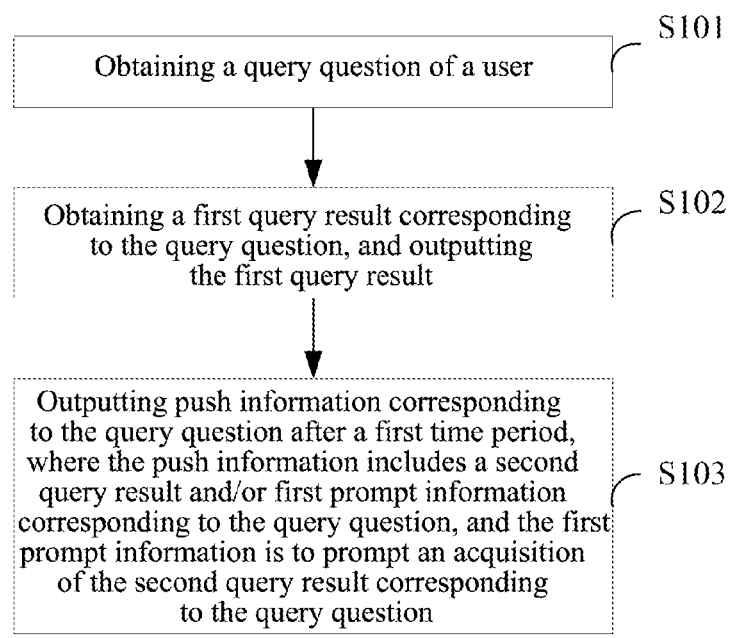
FIG. 1 is a flowchart of a method for intelligent interaction according to Embodiment I of the present disclosure.

FIG. 1 is a flowchart of a method for intelligent interaction according to Embodiment I of the present disclosure. As shown in FIG. 1, the method provided in this embodiment may include the following steps:

Step 101: obtaining a query question of a user.

The query question may be input by the user through text, and the user may input text through an input device such as a virtual key, a physical key, a touch pen or a touch screen on the intelligent device. At present, many intelligent devices support voice recognition in order to liberate the hands of the user, and hence, the user can input the query question by a voice. When the user input the query question through the voice, the intelligent device converts a voice signal into text through the voice recognition. For example, the user can input the following query question by the voice:

"What is the market price of eggs?", "What gift is suitable for Chinese valentine's day?", "Is it good for a 60-year-old man to eat propolis for a long time?", "What are the attractions in Sichuan?", "How to do with neurological migraine" and so on.

Step 102: obtaining a first query result corresponding to the query question, and outputting the first query result.

The intelligent device may sent the query question to a server after obtaining the query question, and according to the query question, the server searches the first query result corresponding to the query question from a database, and sends the first query result to the intelligent device, or it can also be searched from the database by the intelligent device.

It should be noted that, in this embodiment, when any query question is input by the user, a query result may be obtained, and the query result may or may not include an answer to the query question, and a query question may have multiple answers. Therefore, the first query result corresponding to the query question may or may not include an answer. For example, when the query question input by the user is: "Why are there stars in the sky", and the intelligent device does not obtain an answer through querying. When the query question input by the user is "What is the market price of eggs", the intelligent device can obtain multiple answers through querying: the price of one catty of ordinary eggs is between XX-YY yuan, the price of one catty of native eggs is between AA-BB yuan, and one egg is about X yuan, etc.

When the intelligent device only supports voice input and output (for example, an intelligent speaker without a display screen or an intelligent speaker with a small display screen, an intelligent watch, etc.), the intelligent device plays the first query result by a voice. When the intelligent device only supports text input and output, the intelligent device displays the first query result by text. When the intelligent device supports both voice input and output and text input and output (such as an intelligent speaker with a display screen), the intelligent device can output the first query result by text and/or voice.

Step 103: outputting push information corresponding to the query question after a first time period, where the push information includes a second query result and/or first prompt information corresponding to the query question, and the first prompt information is to prompt an acquisition of the second query result corresponding to the query question.

In the prior art, an answer corresponding to the query question may not be obtained, or the user is not satisfied with the answer corresponding to the query question, which results in poor user experience of the intelligent device. Among them, the dissatisfaction of the user with the answer may be caused by an incorrect answer or a poor answer quality. The intelligent device mainly judges whether the user is satisfied with the answer by the user's evaluation of the answer.

In this embodiment, when no answer corresponding to the query question is obtained, or the user is not satisfied with the answer corresponding to the query question, or the user is satisfied with the answer corresponding to the query question, but the user may have other intentions, the intelligent device further searches the query question until obtaining the second query result that may satisfy the user, and outputs the push information corresponding to the query question.

Different from the first query result, the second query result includes at least one answer corresponding to the query question. And the answer corresponding to the query question included in the second query result is different from the answer corresponding to the query question included in the first query result. The second query result is obtained by learning via the intelligent device or the server through a preset policy, and/or input manually. The second query result can be obtained by automatically mining a high-quality answer in a webpage through a DeepQA technology, and the second query result is actively pushed to the user.

In this embodiment, the first time period may be a determinate time, or may be an indeterminate time, and the first time period is a duration from the time when the first query result is output to the time when the second query result is obtained. Usually, the acquisition time of the second query result is indeterminate, mainly because the time of machine learning is indeterminate, and the time for manually inputting the answer is also indeterminate. Therefore, the first time period is an indeterminate time. Of course, the acquisition time of the second query result is determinable in some scenarios. For example, in the case where the time of the next year or a certain holiday is known, but a holiday arrangement of the holiday is unknown, the notification time of the holiday arrangement of the holiday is a determinate time.

In this embodiment, the intelligent device can output the push information corresponding to the query question by using at least one of the following ways:

(1) Sending the push information to a control device for controlling the intelligent device.

Figure 2:
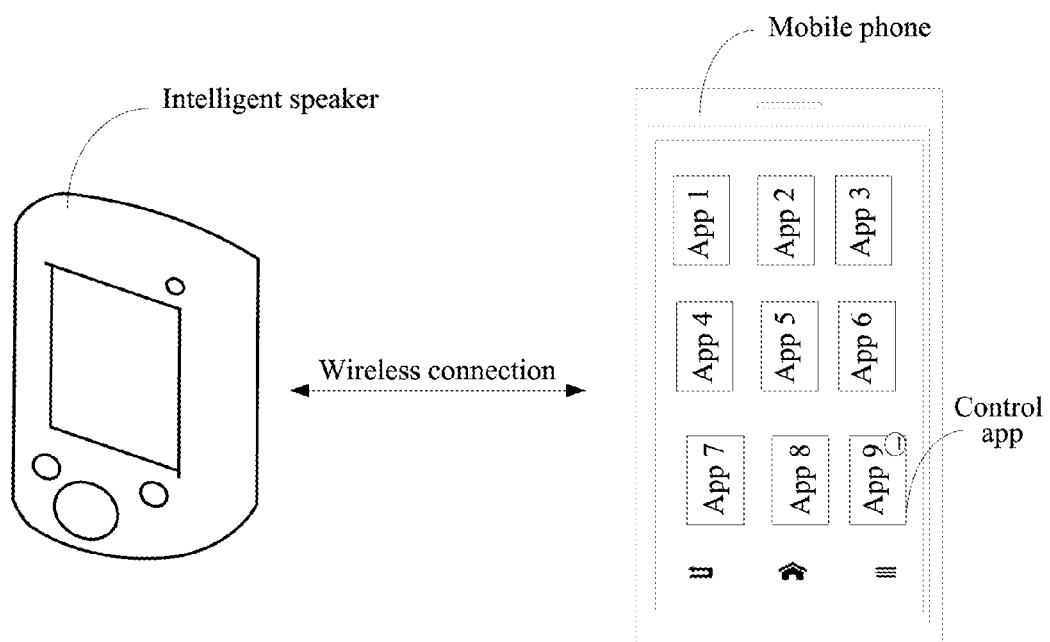
FIG. 2 is a schematic diagram of an output of push information.
Figure 3:
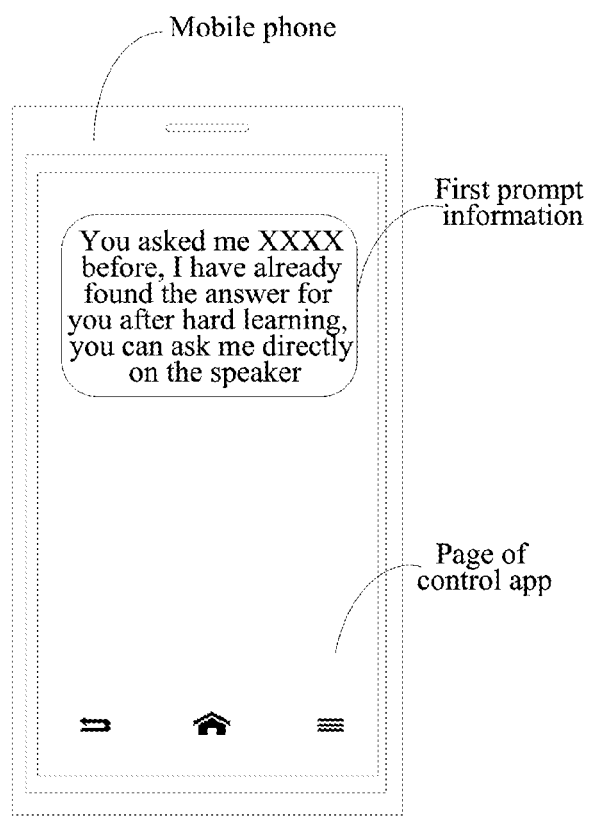
FIG. 3 is a page for displaying the push information after a user opens a control app.

Taking the intelligent device being an intelligent speaker as an example, the control device can be a mobile phone. The intelligent speaker can control the intelligent device through an application (app) installed in the mobile phone, and the user completes the distribution network of the intelligent speaker and other operations through the app. Therefore, the push information can be sent to the app. When the app has new information, a prompt information is displayed in the upper right corner of the icon of the app. The user queries for the push information through the app, and the push information is usually displayed in text form to the customer. FIG. 2 is a schematic diagram of an output of the push information. As shown in FIG. 2, the intelligent device sends the push information to a control app on the mobile phone via a wireless connection. After the control app receives the push information, a round icon in the upper right corner of the icon thereof prompts receiving a message. The user can open the control app to view it. FIG. 3 is a page for displaying the push information after the user opens the control app. As shown in FIG. 3, first prompt information is displayed on the page, and the first prompt message is "You asked me XXXX before, I have already found the answer for you after hard learning, you can ask me directly on the speaker."

Figure 4:
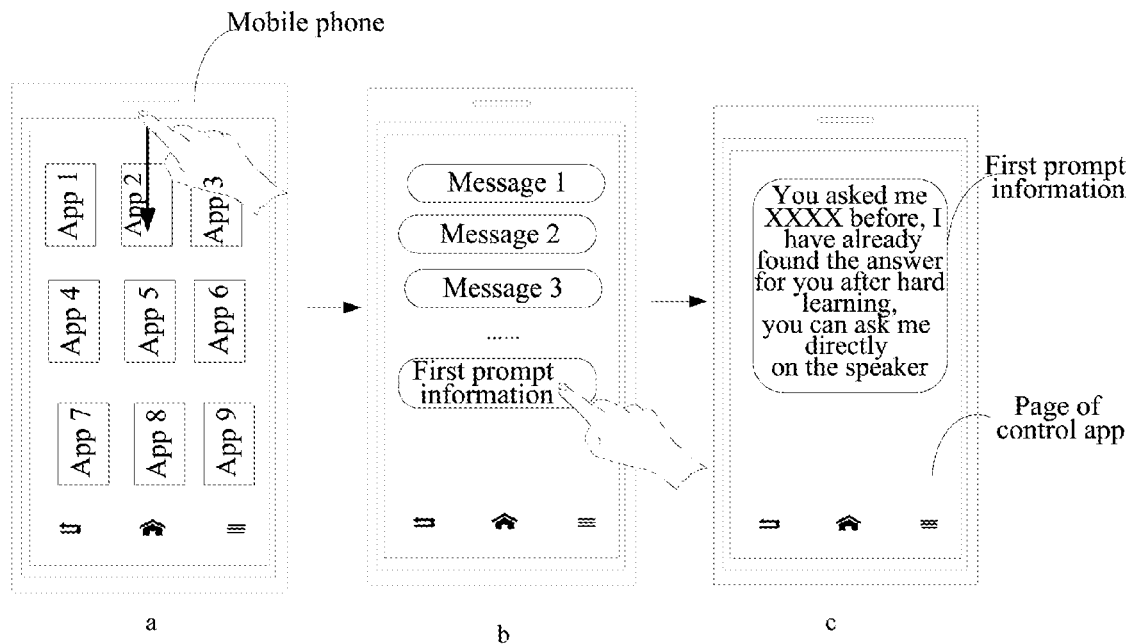
FIG. 4 is a schematic diagram of a display process of the push information on a mobile phone.

The intelligent speaker can also notify the control device of the first prompt information by means of notification, and a notification page (which can be a first screen of the control device, and the user opens the notification page through sliding down from the top of the first screen or other page) of the control device displays entries of multiple pieces of notification information. FIG. 4 is a schematic diagram of a display process of the push information on a mobile phone. As shown in FIG. 4, a page is any page on the mobile phone, and the user opens b page by sliding down from the top of a page. The b page is a notification page, and displays entries of multiple pieces of notification information, including an entry of the first prompt information. The user clicks on the entry of the first prompt information to jump to c page, and c page displays the first prompt information. The user can make a query for the second query result by a voice on the intelligent speaker, or open the control app on the mobile phone to view the second query result.

When the push information includes only the first prompt information, if the first query result does not include an answer corresponding to the query question, the first prompt information may be "You asked me XXXX before, I have already found the answer for you after hard learning, you can ask me directly on the speaker." If the first query result includes the answer corresponding to the query question, but the user is not satisfied with the answer, the first prompt information may be "You were not satisfied with the result of XXXX before, I have found a better answer for you after hard learning, you can ask me directly on the speaker."

When the push information includes the first prompt information and the second query result, if the first query result does not include the answer corresponding to the query question, the first prompt information may be "You asked me XXXX before, I have already found the answer for you after hard learning, please open the app to view." If the first query result includes the answer corresponding to the query question, but the user is not satisfied with the answer, the first prompt information may be "You were not satisfied with the result of XXXX before, I have found a better answer for you after hard learning, please open the app to view."

The second query result and the first prompt information may be displayed on a same page, or may be displayed on a different page. For example, the first prompt information and the second query result are all displayed on a certain page of the app that controls the intelligent device; or the first prompt information is displayed on the notification page of the control device, and the second query result is displayed on a certain page of the app that controls the intelligent device; or the first prompt information is displayed on the notification page of the control device, and the second query result is displayed through a separate H5 page.

This push method is suitable for an intelligent device with or without a display screen. If there are multiple pieces of push information, they can be pushed one by one.

(2) Prompting the user by an indicator light of the intelligent device that the push information is received.

If an indicator light is installed on the intelligent device, the user can be notified by the indicator light that push information has been received. For example, the indicator light is lit to inform the user when the push information is received, and the indicator light is not lit when no push information is received. Or the user is notified by a color of the indicator light, for example, the color of the indicator light is changed to a preset first color when the push information is received, and in other cases, the color of the indicator light is other colors.

(3) Displaying the push information by a notification page on the intelligent device.

Figure 5:
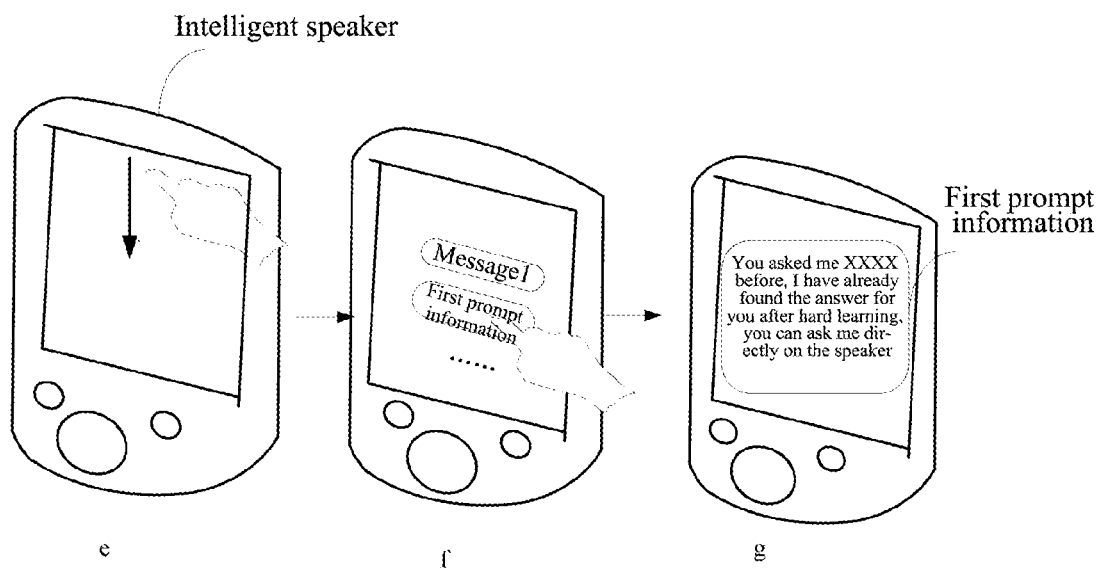
FIG. 5 is a schematic diagram of a display process of the push information on an intelligent speaker.

This solution is suitable for an intelligent device with a display screen, and the push information is displayed on a notification page of the intelligent device. FIG. 5 is a schematic diagram of a display process of the push information on an intelligent speaker. As shown in FIG. 5, e page is any page on the intelligent speaker, the user opens f page by sliding down from the top of the e page. The f page is the notification page, and displays entries of multiple pieces of notification information, including an entry of the first prompt information. The user clicks on the entry of the first prompt information to jump to g page, and the g page displays the first prompt information. The user can make a query for the second query result by a voice on the intelligent speaker.

The notification page can be the first page on the display screen, and the user opens the notification page by pulling down or sliding down.

When the push information includes only the first prompt information, if the first query result does not include the answer corresponding to the query question, the first prompt information may be "XXXX, an answer has been found for you". If the first query result includes the answer corresponding to the query question, but the user is not satisfied with the answer, the first prompt information may be "XXXX, a better answer has been found for you".

When the push message includes both the first prompt information and the second query result, the notification page may display "view the answer", in addition to displaying the first prompt information. When the user clicks the "view the answer", an answer in the second query result can be displayed on the page. If the intelligent device supports voice input and output, the answer in the second query result can be played by a voice. If the intelligent device supports voice input and output, the user can input "view the answer" by a voice when having a query request.

Optionally, the push information is automatically deleted after being viewed by the user, or after being retained for a period of time.

(4) Playing the push information by a voice.

In this embodiment, a output timing of the push information may be that the push information is output immediately after the second query result is obtained, or the push information may be output when a trigger condition is met. The trigger condition may be: (1) Outputting the push information when detecting that the user queries for other question by using the intelligent device again, and an answer to the other question is not obtained or the user is satisfied with the answer to the other question. (2) Outputting the push information when a preset time set by the user is reached. For example, the user can set that the push information can be actively pushed to the user if there is push information between 8:00-10:00 in the evening. (3) Outputting the push information when it is detected that the user makes a query for a query question with a high page view (PV for short). For example, when the user asks "what's the time", the intelligent device outputs push information after outputting a corresponding answer, to remind the user that the question previously asked has an answer. (4) Outputting the push information of a previous query question when it is detected that a vertical class of a current query question of the user is the same as or is similar to a vertical class of the previous query question. For example, the vertical classes of the two query questions are all encyclopedia vertical classes or knowledge spectrum vertical classes. (5) Outputting the push information of a previous query question when it is detected that a current query question of the user is similar to the previous query question. It is possible to determine whether the two query questions are similar by a similarity calculation.

In the above examples, an information question and answer class scenario is taken as an example, that is, the user inputs a query question, does not obtain an answer corresponding to the query question, or the user is not satisfied with the obtained answer corresponding to the query question. Certainly, the method of the present disclosure is not limited to the information question and answer class scenario, and can also be applied to the following scenarios: (1) a content resource class, for example, a music to be made a query by the user is currently no resource, and the user is actively notified after having the resource. (2) a function complement class, for example, a function that the user currently wants to make a query is not present, and after the new function is developed, the user is actively notified of information about the new function.

This embodiment includes obtaining a query question of a user, obtaining a first query result corresponding to the query question, and outputting the first query result, and outputting push information corresponding to the query question after a first time period, where the push information includes a second query result and/or first prompt information corresponding to the query question, and the first prompt information is to prompt an acquisition of the second query result corresponding to the query question. The method actively pushes the second query result corresponding to the query question to the user and/or prompts the user an acquisition of the second query result, after a delay of the first time period, to meet an unmet need of the user, or to better meet the need of the user, thereby improving a user experience.

Figure 6:
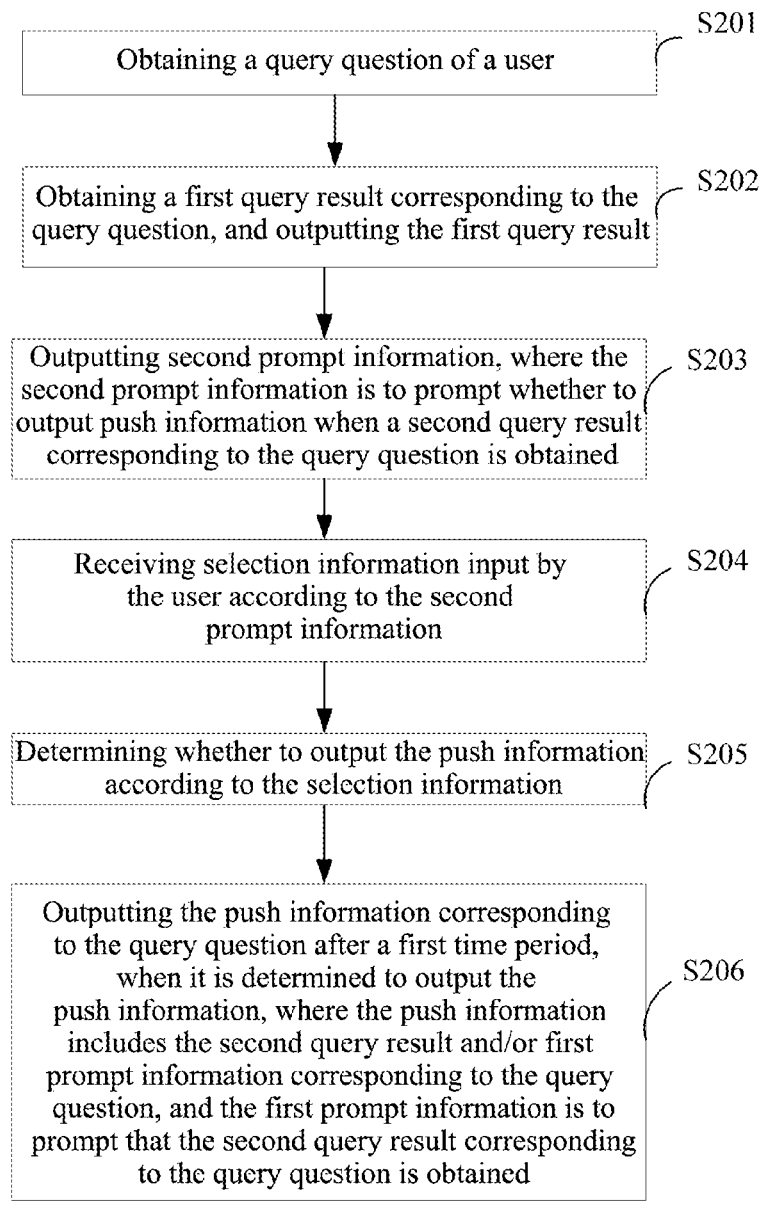
FIG. 6 is a flowchart of a method for intelligent interaction according to Embodiment II of the present disclosure.

FIG. 6 is a flowchart of a method for intelligent interaction according to Embodiment II of the present disclosure. As shown in FIG. 6, the method provided in this embodiment may include the following steps:

Step 201: obtaining a query question of a user.

Step 202: obtaining a first query result corresponding to the query question, and outputting the first query result.

The specific implementation manners of steps S201 and S202 refer to the descriptions of steps S101 and S102 in Embodiment I, and details are not described herein again.

Step 203: outputting second prompt information, where the second prompt information is to prompt whether to output push information when a second query result corresponding to the query question is obtained.

Not all questions need to obtain a query result again. In this embodiment, the following two ways can be used to determine whether it is needed to obtain a query result again, and push the query result to the user.

In an exemplary embodiment, the query question is analyzed and processed, to obtain a type of the query question. According to the type of the query question, it is determined whether to output the second prompt information.

It is possible to predefine which types of query questions need to output the second prompt information, and which types of query questions do not need to output the second prompt information. When the first query result is obtained, it is possible to trigger analysis and processing of the query question in the case that the first query result does not include the answer corresponding to the query question, and of course, it is also possible to trigger analysis and processing of the query question in the case that the first query result includes the answer corresponding to the query question. This embodiment does not limit this. Certainly, a time to trigger the analysis and processing of the query question is not limited to the time when the first query result is obtained, and may be before the first query result is obtained or at any time after receiving the query question.

Generally, for the following two types of query questions, the query result needs to be obtained again and pushed to the user: (1) The query question is of a general question and answer intention, and the answer corresponding to the query question is not included in the first query result. The question of the general question and answer intention is, for example, "why are there stars in the sky", "what is outside the sky", etc., whether the query question is the general question and answer intention is determined by a set strategy. (2) A category in which the answer is fixed and can be optimized in a short period of time, such as translation, calculation, Chinese KG question and answer. For some categories in which answers require a high timeliness and depend on a data resource, such as weather, stocks, etc., the solution for delaying the obtaining of query result in this embodiment is not applicable.

In another exemplary embodiment, evaluation information of the user on the first query result is received, and emotional analysis on the evaluation information is performed, and the second prompt information is determined to be output when the evaluation information indicates that the user is not satisfied with the first query result.

After outputting the first query result, the intelligent device can actively trigger the user to evaluate the first query result. For example, the intelligent device outputs the prompt information "Whether are you satisfied with the current answer", and the user may make a feedback of satisfaction, dissatisfaction, very satisfied, or very dissatisfied. The user may also make a feedback of other words, such as "it's okay, it's normal, it's pretty much, it's too bad, what is this" and so on. After receiving the evaluation information of the user, the intelligent device can respond, for example, outputting "Thank you for your feedback, I will continue to study hard." Of course, the user may not make an evaluation.

Optionally, before the intelligent device actively triggers the user to evaluate the first query result, the intelligent device may further determine whether at least one answer corresponding to the query question is included in the first query result. The user is triggered to evaluate the first query result when the first query result includes at least one answer corresponding to the query question. When the first query result does not include the answer corresponding to the query question, the user is not triggered to evaluate the first query result. Correspondingly, the intelligent device receives the evaluation information of the user on the answer included in the first query result, and the first query result may include multiple answers, the intelligent device outputs the answers in a certain order.

After the intelligent device outputs the first query result, the user may also actively evaluate the first query result. For example, after obtaining the first query result, the user may say "error result" or "change one" or "Why no results" by a voice, etc.

After obtaining the evaluation information of the user on the first query result, the intelligent device performs an emotional analysis on the evaluation information to obtain an emotional tendency of the evaluation information, for example, for evaluations such as "satisfaction", "bot bad" and "good", it is considered that the emotional tendency is to be satisfied with the first query result, and for the evaluations such as "unsatisfied", "what is this" and "it is too bad", it is considered that the emotional tendency is to be unsatisfied with the first query result. If the intelligent device actively prompts the user to perform an evaluation, the user does not make the evaluation, it may also be considered that the user is dissatisfied with the first query result. When the evaluation information indicates that the user is not satisfied with the first query result, it is determined to output the second prompt information. When the evaluation information indicates that the user is satisfied with the first query result, the interaction process is ended.

When the first query result does not include the answer corresponding to the query question, the second prompt information may be "I don't know about this question yet, but I will continue to study hard, do you need me to tell you after learning". When the first query result includes the answer corresponding to the query question, but the user is not satisfied with the answer, the second prompt information may be "I am very sorry that I did not find the answer that you are satisfied with, I will continue to study hard, do you need me to tell you after learning".

Optionally, when the first query result does not include the answer corresponding to the query question, or the user is not satisfied with the answer corresponding to the query question, the query question may be saved. In one way, as long as the answer corresponding to the query question is not included in the first query result, or the user is not satisfied with the answer corresponding to the query question, the query question is stored.

In another way, when the first query result does not include the answer corresponding to the query question, or the user is not satisfied with the answer corresponding to the query question, the hotness, the historical search frequency, etc. of the query question are calculated on line, to determine whether the query question is a high frequency search question according to the hotness, the historical search frequency, etc. of the query question. If the query question is a high frequency search question, the query question is stored. It is also possible to offline determine whether to store the query question and periodically analyze whether the query question is a high frequency search question through offline data, and if the query question is a high frequency search question, the query question is stored.

For the stored high-frequency search question, it is needed to give an answer in time. It is possible to automatically mine a high-quality answer in a webpage by DeepQA technology, and actively push the obtained answer to the user.

Step 204: receiving selection information input by the user according to the second prompt information.

Step 205: determining whether to output the push information according to the selection information.

After receiving the second prompt information, the user inputs the selection information, and the intelligent device determines whether to output the push information after receiving the selection information. Exemplarily, when the selection information is positive information, it is determined to output the push information. When the selection information is negative information, it is determined not to output the push information. If the user does not input any information within a preset time, it is determined not to output the push information.

Step S206: outputting the push information corresponding to the query question after a first time period, when it is determined to output the push information, where the push information includes the second query result and/or first prompt information corresponding to the query question, and the first prompt information is to prompt that the second query result corresponding to the query question is obtained.

For a specific implementation of step 206, refer to the description of step S103 in Embodiment I, and details are not described herein again.

In this embodiment, before outputting the push information corresponding to the query question, the terminal device outputs second prompt information, where the second prompt information is to prompt whether to output the push information when the second query result corresponding to the query question is obtained; receives the determination information input by the user according to the second prompt information, where the determination information is used to confirm the output of the push information. The second prompt information is used to ask the user whether there is a need to obtain the query result again, so that pushing to the user can be performed in a targeted manner, thereby a user experience can be further improved.

Figure 7:
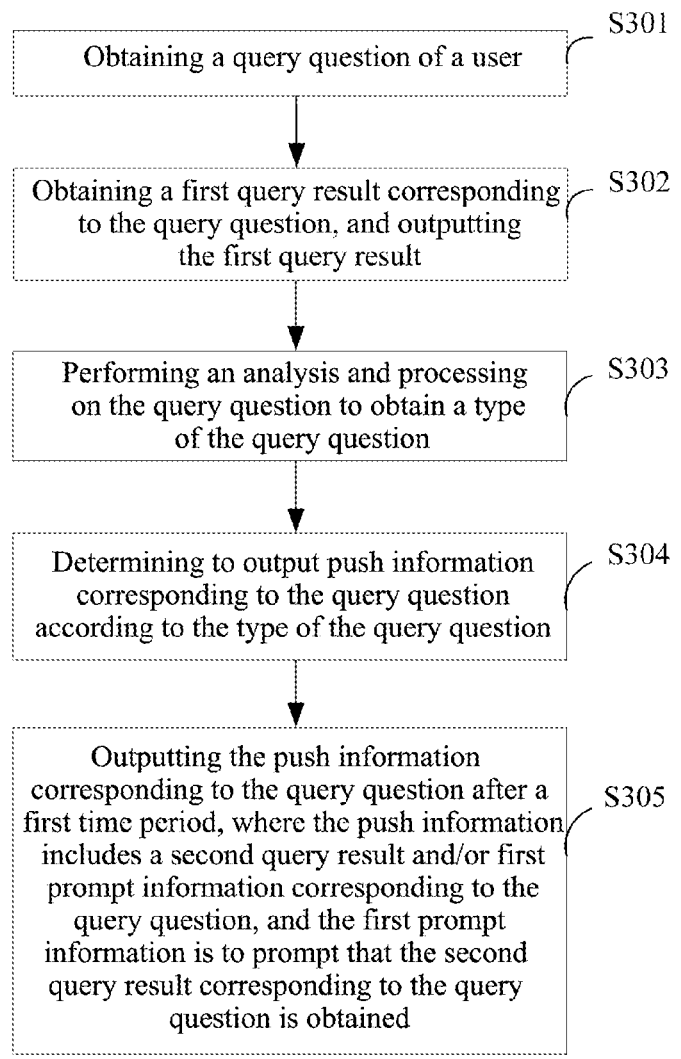
FIG. 7 is a flowchart of a method for intelligent interaction according to Embodiment III of the present disclosure.

FIG. 7 is a flowchart of a method for intelligent interaction according to Embodiment III of the present disclosure. As shown in FIG. 7, the method provided in this embodiment may include the following steps:

Step 301: obtaining a query question of a user.

Step 302: obtaining a first query result corresponding to the query question, and outputting the first query result.

For specific implementations of the steps 301 and 302, refer to the descriptions of the steps 101 and 102 in Embodiment I, and details are not described herein again.

Step 303: performing an analysis and processing on the query question to obtain a type of the query question.

Step 304: determining to output push information corresponding to the query question according to the type of the query question.

For specific implementations of the steps 303 and 304, refer to the related descriptions of Embodiment II, and details are not described herein again. It should be noted that the timing of triggering analysis and processing of the query question is not limited to the time when the first query result is obtained, and may be before the first query result is obtained, or may be at any time after receiving the query question.

Step 305: outputting the push information corresponding to the query question after a first time period, where the push information includes a second query result and/or first prompt information corresponding to the query question, and the first prompt information is to prompt that the second query result corresponding to the query question is obtained.

For a specific implementation of step 305, refer to the description of step S103 in Embodiment I, and details are not described herein again.

This embodiment includes analyzing and processing a query question, to obtain a type of the query problem; according to the type of the query question, determining whether it is needed to output push information corresponding to the query question to the user. This push process does not require user's participation, and can actively push information to a user in a targeted manner, thereby further improving user's experience.

Figure 8:
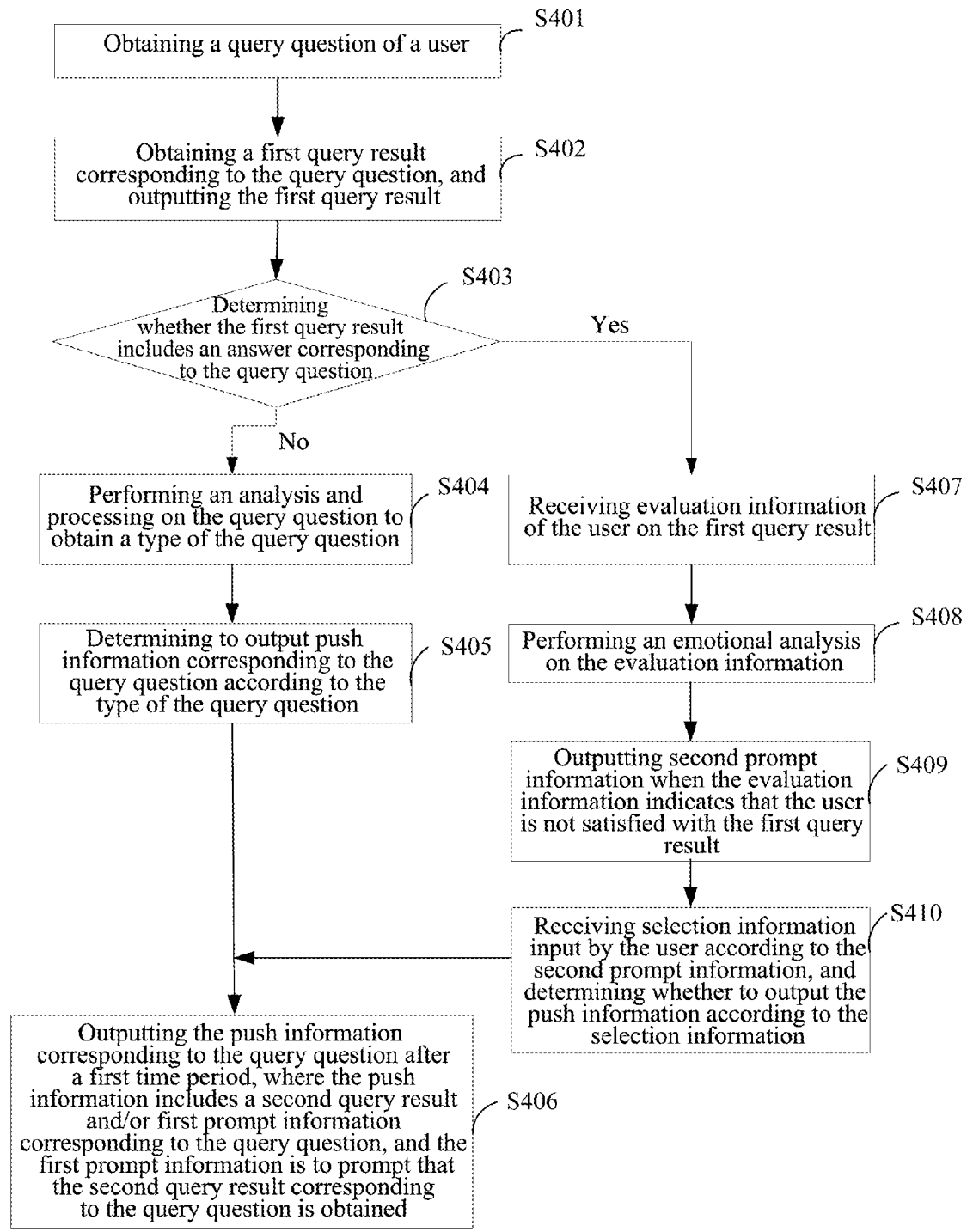
FIG. 8 is a flowchart of a method for intelligent interaction according to Embodiment IV of the present disclosure.

FIG. 8 is a flowchart of a method for intelligent interaction according to Embodiment IV of the present disclosure. As shown in FIG. 8, the method provided in this embodiment may include the following steps:

Step 401: obtaining a query question of a user.

Step 402: obtaining a first query result corresponding to the query question, and outputting the first query result.

For specific implementations of steps 401 and 402, refer to the descriptions of steps 101 and 102 in Embodiment I, and details are not described herein again.

Step 403: determining whether the first query result includes an answer corresponding to the query question.

When the first query result does not include the answer corresponding to the query question, step 404 is performed, and when the first query result includes the answer corresponding to the query question, step 407 is performed.

Step 404: performing an analysis and processing on the query question to obtain a type of the query question.

Step 405: determining to output push information corresponding to the query question according to the type of the query question.

Step 406: outputting the push information corresponding to the query question after a first time period, where the push information includes a second query result and/or first prompt information corresponding to the query question, and the first prompt information is to prompt that the second query result corresponding to the query question is obtained.

For a specific implementation of the step 406, refer to the description of step S103 in Embodiment I, and details are not described herein again.

Step 407: receiving evaluation information of the user on the first query result.

Step 408: performing an emotional analysis on the evaluation information.

Step 409: outputting second prompt information when the evaluation information indicates that the user is not satisfied with the first query result.

The second prompt information is to prompt whether to output the push information when the second query result corresponding to the query question is obtained.

Step 410: receiving selection information input by the user according to the second prompt information, and determining whether to output the push information according to the selection information.

When it is determined that the push information is output, the flow returns to step S406. When it is determined that the push information is not output, the push process is ended.

Exemplarily, when the selection information is positive information, it is determined that the push information is output, and when the selection information is negative information, it is determined that the push information is not output. If the user does not input any information within a preset time, it is determined that the push information is not output.

For specific implementations of the steps 404, 405, and 407 to 410, refer to the related descriptions of Embodiment II, and details are not described herein again.

In this embodiment, after obtaining a first query result corresponding to a query question, whether the first query result includes an answer corresponding to the query question is determined. For the case that the first query result does not include the answer, analysis and processing of the query question is performed to obtain a type of the query question, it is determined whether push information corresponding to the query question needs to be output to the user according to the type of the query question. For the case that the first query result includes the answer, evaluation information of the user on the first query result is obtained, and if the user is not satisfied with the first query result, a second query result of the query question is re-acquired, and the push information corresponding to the query question is output after a first time period. The user experience can be improved by providing different delayed push solutions for different situations.

Figure 9:
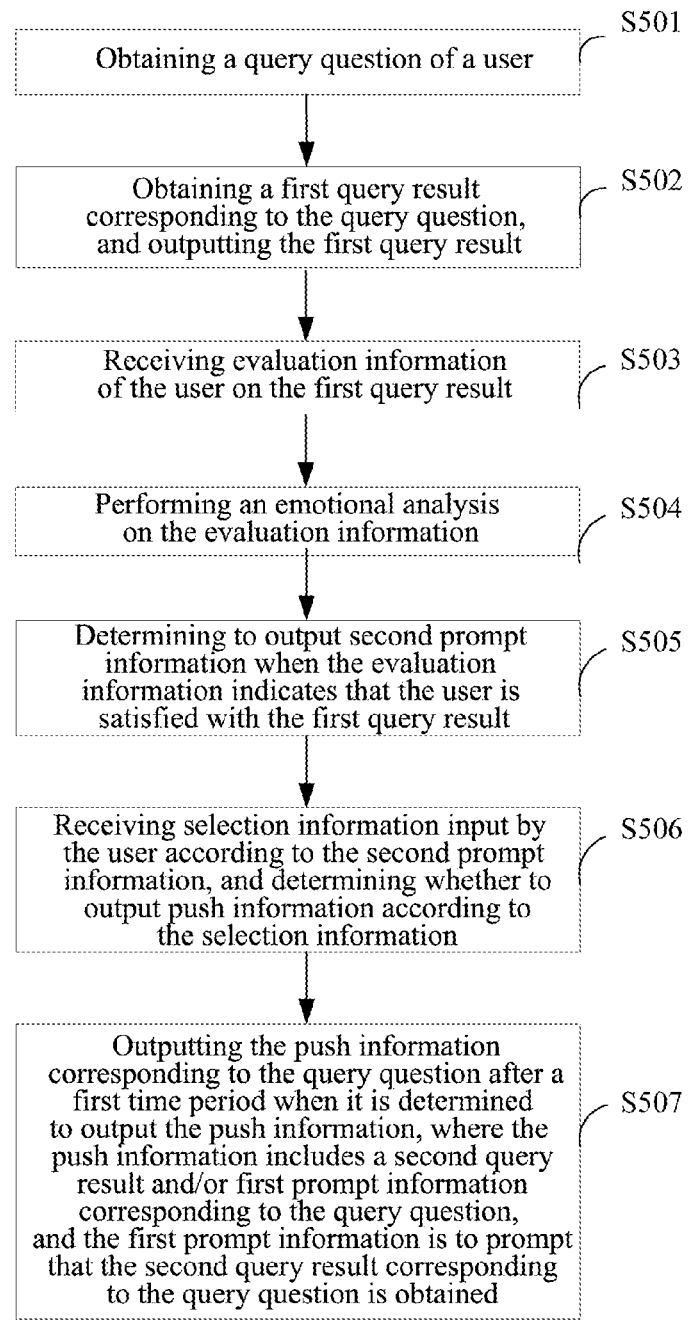
FIG. 9 is a flowchart of a method for intelligent interaction according to Embodiment V of the present disclosure.

FIG. 9 is a flowchart of a method for intelligent interaction according to Embodiment V of the present disclosure. The method in this embodiment is applicable to the scenario where the user is satisfied with the first query result, but in order to improve the user experience, an answer to a related question of the query question is actively pushed to the user. As shown in FIG. 9, the method provided in this embodiment may include the following steps:

Step 501: obtaining a query question of a user.

Step 502: obtaining a first query result corresponding to the query question, and outputting the first query result.

Step 503: receiving evaluation information of the user on the first query result.

Step 504: performing an emotional analysis on the evaluation information.

Step 505: determining to output second prompt information when the evaluation information indicates that the user is satisfied with the first query result.

The second prompt information is to prompt whether to output push information when a second query result corresponding to the query question is obtained.

Step 506: receiving selection information input by the user according to the second prompt information, and determining whether to output the push information according to the selection information.

For specific implementations of the steps 501-505, refer to the related descriptions of the foregoing embodiments, and details are not described herein again. When it is determined that the push information is output, step 507 is performed. When it is determined that the push information is not output, the push process is ended. Exemplarily, when the selection information is positive information, it is determined that the push information is output, and when the selection information is negative information, it is determined that the push information is not output. If the user does not input any information within a preset time, it is determined that the push information is not output.

Step 507: outputting the push information corresponding to the query question after a first time period, where the push information includes a second query result and/or first prompt information corresponding to the query question, and the first prompt information is to prompt that the second query result corresponding to the query question is obtained.

Different from the solutions of Embodiment II to Embodiment IV, in this embodiment, when the evaluation information indicates that the user is satisfied with the first query result, the second query result is a query result of a related question of the query question, but not a query result of the query question.

For example, the user enters a query question through an intelligent speaker: "Xiao Du, Xiao Du, when is the Mid-Autumn Festival next year?", the intelligent speaker outputs a first query result "The Mid-Autumn Festival in 2019 Sep. 13, Friday". According to the query question input by the user, it is analyzed that the user may want to know a holiday arrangement of the Mid-Autumn Festival next year. At this time, the holiday arrangement of the Mid-Autumn Festival next year is a question related to the query question input by the user. If, at present, the holiday arrangement for the Mid-Autumn Festival next year has not been announced yet, the intelligent speaker can output the following second prompt information: "At present, the holiday arrangement of the Mid-Autumn Festival has not been announced yet, do you need Xiao Du to tell you after the announcement?" If the user expresses a definite intention, the holiday arrangement of the Mid-Autumn Festival is pushed to the user after the holiday arrangement of the Mid-Autumn Festival is announced, where the holiday arrangement of the Mid-Autumn Festival is the query result of the related question of the query question input by the user.

Optionally, an obtaining time of the second query result is a determinable time, and correspondingly, the second prompt information further includes an acquiring time of the second query result.

In an exemplary embodiment, the second prompt information is output when the first query result corresponding to the query question is output. That is, no matter whether the user is satisfied with the first query result, the second prompt information is output, making an inquiry whether the user needs to obtain the second query result corresponding to the query question.

In another exemplary embodiment, before outputting the first query result corresponding to the query question, it is predicted whether the user is satisfied with the first query result. When it is predicted that the user is satisfied with the first query result, the second prompt information is output, where the second query result is a query result of a related question of the query question. When the first query result does not include the answer corresponding to the query question, it is predicted that the user is not satisfied with the first query result. When the first query result includes the answer corresponding to the query question, correlation between the answer and the query question is calculated, and it is determined whether the user is satisfied with the first query result according to the correlation between the answer and the question.

In this embodiment, evaluation information of the user on the first query result is obtained, and an emotional analysis is performed on the evaluation information. When the evaluation information indicates that the user is satisfied with the first query result, second prompt information is determined to be output, and the second prompt information is to prompt whether to output push information when obtaining a second query result corresponding to the query question. After a first time period, the push information corresponding to the query question is output. In this embodiment, the second query result is a query result of a related question of the query question, so as to implement pushing the query result of the related question of the query question to the user when the user is satisfied with the query result. The user experience has been improved.

Figure 10:
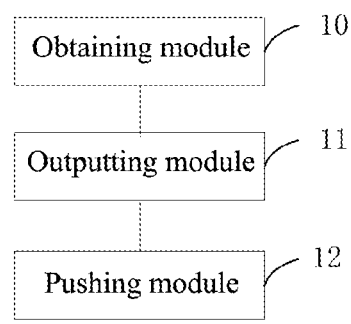
FIG. 10 is a schematic structural diagram of an apparatus for intelligent interaction according to Embodiment VI of the present disclosure.

FIG. 10 is a schematic structural diagram of an apparatus for intelligent interaction according to Embodiment VI of the present disclosure. As shown in FIG. 10, the apparatus provided in this embodiment includes:

an obtaining module 10, configured to obtain a query question of a user;

the obtaining module 10 being further configured to obtain a first query result corresponding to the query question;

an outputting module 11, configured to output the first query result; and a pushing module 12, configured to output push information corresponding to the query question after a first time period, where the push information includes a second query result and/or first prompt information corresponding to the query question, and the first prompt information is to prompt an acquisition of the second query result corresponding to the query question.

In an exemplary embodiment, the second prompt information is output when the first query result corresponding to the query question is output.

In an exemplary embodiment, the apparatus is applied to an intelligent device, and the pushing module 12 is specifically configured to:

send the push information to a control device for controlling the intelligent device;

or, prompt the user by an indicator light of the intelligent device that the push information is received;

or, display the push information by a notification page on the intelligent device;

or, play the push information by a voice.

In an exemplary embodiment, the pushing module 12 is specifically configured to:

play the push information by a voice, when it is detected that the user uses the intelligent device to query other question again, and an answer to the other question is not obtained or the user is satisfied with the answer to the other question;

or, play the push information when a preset time of the user is reached.

Figure 11:
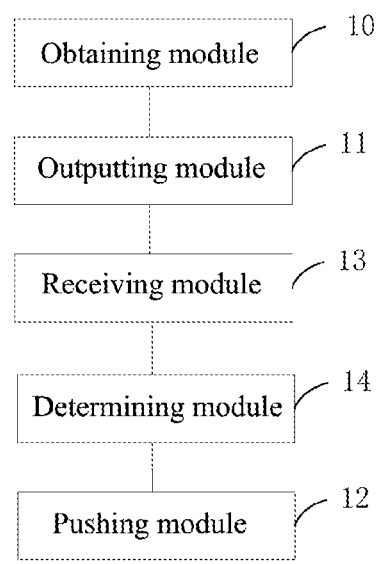
FIG. 11 is a schematic structural diagram of an apparatus for intelligent interaction according to Embodiment VII of the present disclosure.

FIG. 11 is a schematic structural diagram of an apparatus for intelligent interaction according to Embodiment VII of the present disclosure. As shown in FIG. 11, the apparatus in this embodiment, on the basis shown in FIG. 10, further includes: a receiving module 13 and a determining module 14.

The outputting module 11 is further configured to:

output the second prompt information, where the second prompt information is used to prompt whether to output the push information when the second query result corresponding to the query question is obtained;

the receiving module 13 is configured to receive selection information input by the user according to the second prompt information;

the determining module 14 is configured to determine whether to output the push information according to the selection information.

In an exemplary embodiment, the determining module 15 is specifically configured to: determine to output the push information when the selection information is positive information; determine not to output the push information when the selection information is negative information.

Figure 12:
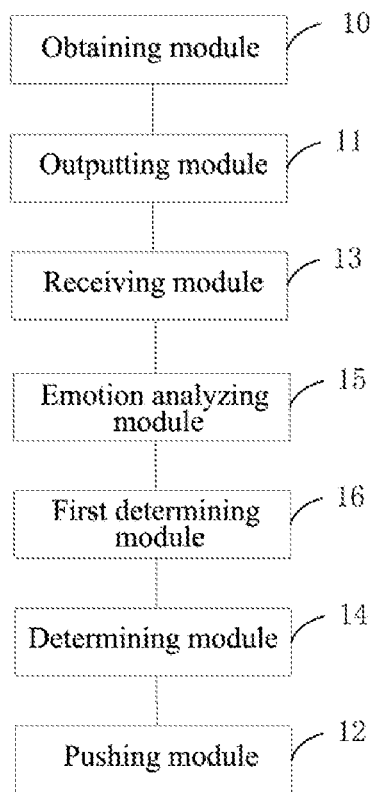
FIG. 12 is a schematic structural diagram of an apparatus for intelligent interaction according to Embodiment VIII of the present disclosure.

FIG. 12 is a schematic structural diagram of an apparatus for intelligent interaction according to Embodiment VIII of the present disclosure. As shown in FIG. 12, the apparatus in this embodiment, on the basis shown in FIG. 11, further includes: an emotion analyzing module 15 and a first determining module 16.

The receiving module 13 is further configured to receive evaluation information of the user on the first query result;

the emotion analyzing module 15 is configured to perform emotional analysis on the evaluation information;

the first determining module 16 is configured to determine to output the second prompt information when the evaluation information indicates that the user is not satisfied with the first query result.

In an exemplary embodiment, the apparatus further includes:

a fourth determining module (not shown), configured to determine that the first query result includes at least one answer corresponding to the query question;

the receiving module 13 is specifically configured to:

receive the evaluation information of the user on the answer included in the first query result.

Figure 13:
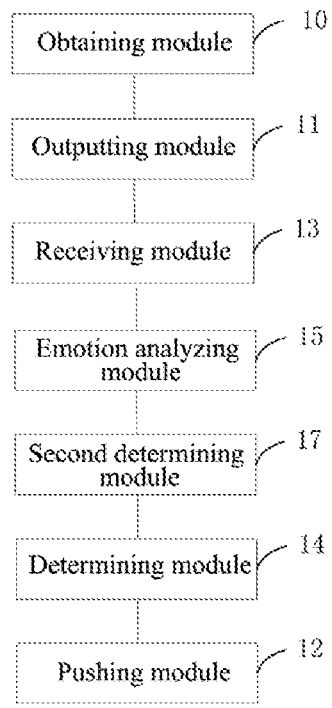
FIG. 13 is a schematic structural diagram of an apparatus for intelligent interaction according to Embodiment IX of the present disclosure.

FIG. 13 is a schematic structural diagram of an apparatus for intelligent interaction according to Embodiment IX of the present disclosure. As shown in FIG. 13, the apparatus in this embodiment, on the basis shown in FIG. 11, further includes: an emotion analyzing module 15 and a second determining module 17.

The receiving module 13 is further configured to receive the evaluation information of the user on the first query result;

the emotion analyzing module 15 is configured to perform an emotional analysis on the evaluation information;

the second determining module 17 is configured to determine to output the second prompt information when the evaluation information indicates that the user is satisfied with the first query result, where the second query result is a query result of a related question of the query question.

In an exemplary embodiment, the apparatus further includes:

a fourth determining module (not shown), configured to determine that the first query result includes at least one answer corresponding to the query question;

the receiving module 13 is specifically configured to:

receive the evaluation information of the user on the answer included in the first query result.

Figure 14:
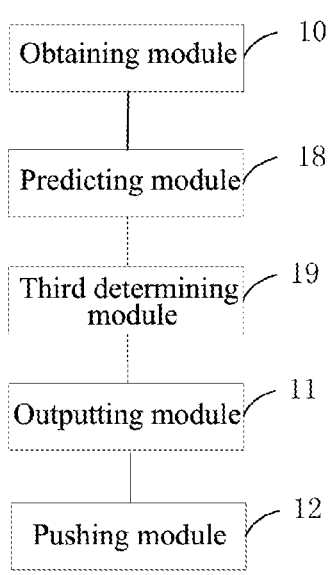
FIG. 14 is a schematic structural diagram of an apparatus for intelligent interaction according to Embodiment X of the present disclosure.

FIG. 14 is a schematic structural diagram of an apparatus for intelligent interaction according to Embodiment X of the present disclosure. In this embodiment, the second prompt information is output when the first query result corresponding to the query question is output.

As shown in FIG. 14, the apparatus in this embodiment, on the basis shown in FIG. 10, further includes:

a predicting module 18, configured to predict whether the user is satisfied with the first query result; and a third determining module 19, configured to determine to output the second prompt information when the predicting module predicts that the user is satisfied with the first query result, where the second query result is a query result of a related question of the query question.

In an exemplary embodiment, an acquisition time of the second query result is a known time, and the second prompt information further includes the acquisition time of the second query result.

Figure 15:
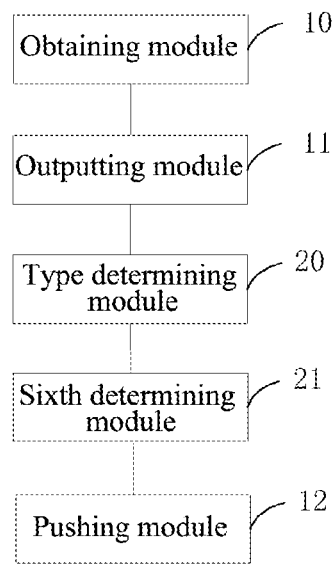
FIG. 15 is a schematic structural diagram of an apparatus for intelligent interaction according to Embodiment XI of the present disclosure.

FIG. 15 is a schematic structural diagram of an apparatus for intelligent interaction according to Embodiment XI of the present disclosure. As shown in FIG. 15, on the basis of embodiment shown in FIG. 10, the apparatus in this embodiment further includes:

a type determining module 20, configured to perform an analysis and processing on the query question to obtain a type of the query question; and a sixth determining module 21, configured to determine to output the push information corresponding to the query question according to the type of the query question.

In an exemplary embodiment, the apparatus further includes:

a seventh determining module (not shown), configured to determine that the first query result does not include the answer corresponding to the query question.

Figure 16:
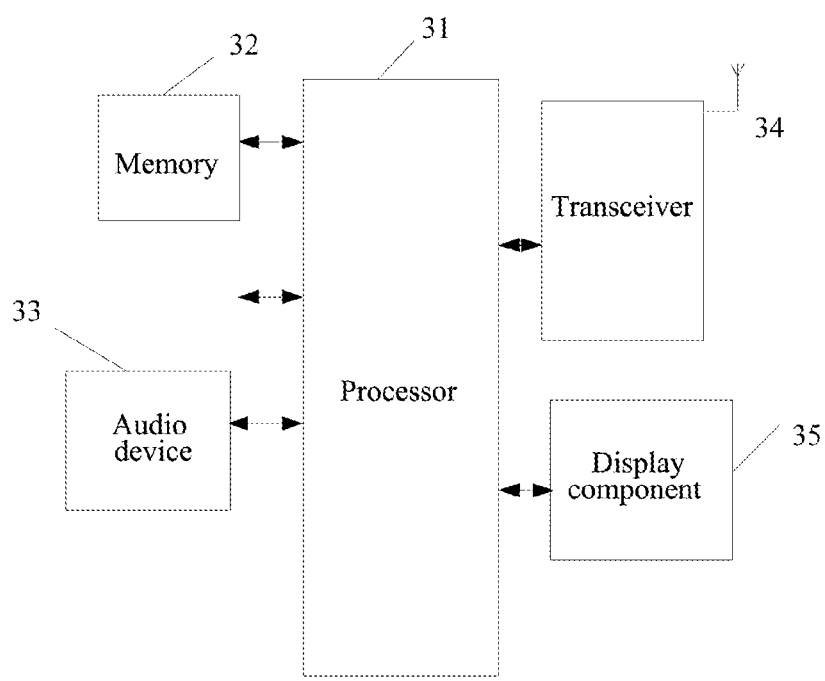
FIG. 16 is a schematic structural diagram of an intelligent device according to Embodiment XII of the present disclosure.

FIG. 16 is a schematic structural diagram of an intelligent device according to Embodiment XII of the present disclosure. As shown in FIG. 16, the intelligent device provided in this embodiment includes a processor 31, a memory 32, an audio device 33, and a transceiver 34, where the memory 32, the audio device 33 and the transceiver 34 are coupled with and in communication with the processor 31 through a bus, the memory 32 is configured to store instructions, the audio device 33 is configured to process a voice signal, and the transceiver 34 is configured to communicate with other device, and the processor 31 is configured to execute the instructions stored in the memory 32, so that the intelligent device performs the method as described in Embodiment I or Embodiment II, and details are not described herein again.

Where the processor 31 may be a Microcontroller Unit (MCU), and the MCU is also called a Single Chip Microcomputer or a singlechip. The processor 31 may also be a Central Process Unit (CPU), a digital signal processor (DSP), an Application Specific Integrated Circuit (ASIC), a Field Programmable Gate Array (FPGA) or other programmable logic device, discrete gate or transistor logic device.

The memory 32 can be implemented by any type of volatile or non-volatile storage device or a combination thereof, such as Static Random-Access Memory (SRAM), Electrically Erasable Programmable Read Only Memory (EEPROM), Erasable Programmable Read Only Memory (EPROM), Programmable Read-Only Memory (PROM), Read Only Memory (ROM), magnetic memory, flash memory, magnetic disk or optical disk.

The audio device 33 may include audio input and output device such as a microphone and a loudspeaker, and may also include an audio coding and decoding device or an audio enhancement device. The audio device 33 is capable of collecting a voice signal input by a user and playing the voice signal.

The transceiver 34 can establish a wired or wireless communication link with other device so that the intelligent device can access a wireless network based on a communication standard, such as WiFi, 2G or 3G, or a combination thereof. In an exemplary embodiment, the transceiver 34 further includes a near field communication (NFC) module to facilitate a short range communication. For example, the NFC module can be implemented based on Radio Frequency Identification (RFID) technology, Infrared Data Association (IrDA) technology, Ultra-wideband (UWB) technology, Bluetooth (BT) technology, and other technology.

Optionally, the intelligent device further includes a display component 35, and the display component can be a Light Emitting Diode (LED) display screen. In an exemplary embodiment, the intelligent device may include only one of the audio device 33 and the display component 35.

The bus may be an Industry Standard Architecture (ISA) bus, a Peripheral Component Interconnection (PCI) bus, or an Extended Industry Standard Architecture (EISA) bus, and so on. The bus can be divided into an address bus, a data bus, a control bus, and so on. For ease of representation, the bus in the drawings of the present application is not limited to only one bus or one type of bus.

Embodiment XIII of the present disclosure provides a computer readable storage medium, the computer readable storage medium stores instructions that when executed, enables the computer to perform the methods as described in Embodiments I to V.

Finally, it should be noted that the foregoing embodiments are merely intended for describing the technical solutions of the present disclosure other than limiting the present disclosure. Although the present disclosure is described in detail with reference to the foregoing embodiments, persons of ordinary skill in the art should understand that they may still make modifications to the technical solutions described in the foregoing embodiments or make equivalent substitutions to some technical features thereof, without departing from the spirit and scope of the technical solutions of embodiments of the present disclosure.

What is claimed is:

1. A method for intelligent interaction, comprising:
   obtaining a query question of a user;
   obtaining a first query result corresponding to the query question;
   outputting the first query result;
   outputting push information corresponding to the query question after a first time period, wherein
      the push information comprises first prompt information corresponding to the query question, or a second query result and the first prompt information,
      the first prompt information is to prompt that the second query result corresponding to the query question is acquired, and
      the second query result includes a query result of a related query question of the query question;
   predicting whether the user is satisfied with the first query result prior to presenting the first query result to the user, wherein the predicting comprises:

when the first query result does not comprise an answer corresponding to the query question, predicting that the user is not satisfied with the first query result, and when the first query result comprises the answer corresponding to the query question, predicting whether the user is satisfied with the first query result according to calculated correlation between the answer and the query question;

in response to predicting that the user is satisfied with the first query result prior to presenting the first query result to the user, outputting the second prompt information, wherein the second prompt information is to prompt whether to output the push information when the second query result corresponding to the query question is acquired;

receiving an input of selection information by the user according to the second prompt information; and determining whether to output the push information according to the selection information.

2. The method according to claim 1, wherein the determining whether to output the push information according to the selection information comprises:

outputting the push information when the selection information is positive information; and not outputting the push information when the selection information is negative information.

3. The method according to claim 1, wherein before the outputting of the second prompt information, the method comprises:

receiving evaluation information of the user on the first query result;

performing an emotional analysis on the evaluation information; and outputting the second prompt information when the evaluation information indicates that the user is not satisfied with the first query result.

4. The method according to claim 3, wherein before the receiving of the evaluation information of the user on the first query result, the method further comprises:

determining that the first query result comprises at least one answer corresponding to the query question;

the receiving of the evaluation information of the user on the first query result comprises:

receiving the evaluation information of the user on the answer comprised in the first query result.

5. The method according to claim 1, wherein before the outputting second prompt information, the method further comprises:

receiving evaluation information of the user on the first query result;

performing an emotional analysis on the evaluation information; and outputting the second prompt information when the evaluation information indicates that the user is satisfied with the first query result.

6. The method according to claim 5, wherein acquisition time of the second query result is a determinable time, and the second prompt information further comprises the acquisition time of the second query result.

7. The method according to claim 1, wherein the second prompt information is outputted with the first query result corresponding to the query question.

8. The method according to claim 1, wherein before the outputting of the second prompt information, the method further comprises:

performing an analysis and processing on the query question to obtain a type of the query question; and outputting the second prompt information according to the type of the query question.

9. The method according to claim 8, wherein before the performing of the analysis and processing on the query question, the method further comprises:

determining that the first query result does not comprise the answer corresponding to the query question.

10. The method according to claim 1, wherein before the outputting of the push information corresponding to the query question after the first time period, the method further comprises:

performing an analysis and processing on the query question to obtain a type of the query question; and determining to output the push information corresponding to the query question according to the type of the query question.

11. The method according to claim 1, wherein the method is applied to an intelligent device, and the outputting of the push information corresponding to the query question after the first time period comprises:

outputting the push information by at least one of the following ways:

sending the push information to a control device for controlling the intelligent device; or prompting the user by an indicator light of the intelligent device that the push information is received; or displaying the push information by a notification page on the intelligent device; or playing the push information by a voice.

12. The method according to claim 11, wherein the playing of the push information by the voice comprises:

playing the push information by the voice, when it is detected that the user uses the intelligent device to make another query for other question again, and does not obtain an answer to the other question or the user is satisfied with the answer to the other question; or playing the push information when a preset time of the user is reached.

13. An intelligent device, comprising:

a hardware processor, a memory, an audio device and a transceiver, wherein the audio device is configured to acquire a voice signal, the memory is configured to store instructions, the transceiver is configured to communicate with other devices, and the hardware processor is configured to execute the instructions stored in the memory so that the intelligent device performs the method according to claim 1.

14. An apparatus for intelligent interaction, comprising:

a hardware processor and a memory for storing program codes, which, when executed by the hardware processor, cause the hardware processor to:

obtain a query question of a user;

obtain a first query result corresponding to the query question;

output the first query result;

output push information corresponding to the query question after a first time period, wherein the push information comprises first prompt information corresponding to the query question, or a second query result and the first prompt information corresponding to the query question, the first prompt information is to prompt that the second query result corresponding to the query question is acquired, and the second query result includes a query result of a related query question of the query question;

predict whether the user is satisfied with the first query result prior to presenting the first query result to the user, wherein the predicting comprises:
  when the first query result does not comprise an answer corresponding to the query question, predicting that the user is not satisfied with the first query result, and
  when the first query result comprises the answer corresponding to the query question, predicting whether the user is satisfied with the first query result according to calculated correlation between the answer and the query question;

in response to predicting that the user is satisfied with the first query result prior to presenting the first query result to the user, outputting the second prompt information, wherein the second prompt information is to prompt whether to output the push information when the second query result corresponding to the query question is acquired;

receive an input selection information by the user according to the second prompt information; and determine whether to output the push information according to the selection information.

15. The apparatus according to claim 14, wherein the program codes further cause the processor to:
  output the push information when the selection information is positive information; and
  not output the push information when the selection information is negative information.

16. The apparatus according to claim 14, the program codes further cause the processor to:
  receive evaluation information of the user on the first query result;
  perform an emotional analysis on the evaluation information; and
  output the second prompt information when the evaluation information indicates that the user is not satisfied with the first query result.

17. The apparatus according to claim 14, wherein the program codes further cause the processor to:
  receive evaluation information of the user on the first query result;
  perform an emotional analysis on the evaluation information; and
  output the second prompt information when the evaluation information indicates that the user is satisfied with the first query result.

\* \* \* \* \*